United States Patent
Falcimaigne et al.

(10) Patent No.: US 6,193,191 B1
(45) Date of Patent: Feb. 27, 2001

(54) MODIFIED SURFACE FOR REDUCING THE TURBULENCES OF A FLUID AND TRANSPORTATION PROCESS

(75) Inventors: Jean Falcimaigne, Bois Colombes; Thierry Palermo, La Garenne Colombes; Alexandre Rojey, Rueil Malmaison, all of (FR)

(73) Assignee: Institut Francais du Petrole, Rueil Malmaison (FR)

( * ) Notice: Subject to any disclaimer, the term of this patent is extended or adjusted under 35 U.S.C. 154(b) by 0 days.

(21) Appl. No.: 08/892,268

(22) Filed: Jul. 14, 1997

(30) Foreign Application Priority Data

Jul. 15, 1996 (FR) .................................................. 96 08914

(51) Int. Cl.$^7$ .................................................. B64C 21/10
(52) U.S. Cl. ............................ 244/130; 244/200; 138/37
(58) Field of Search .................................. 244/130, 200; 138/37, 177

(56) References Cited

U.S. PATENT DOCUMENTS

| | | | |
|---|---|---|---|
| 4,650,138 | 3/1987 | Grose | 244/130 |
| 4,759,516 | 7/1988 | Grose | 244/130 |
| 5,107,626 | 4/1992 | Mucci | 51/281 R |
| 5,386,955 | 2/1995 | Savill | 244/200 |
| 5,860,626 | * 1/1999 | Moser | 244/130 |
| 5,891,551 | * 4/1999 | Gibbs | 244/130 |

FOREIGN PATENT DOCUMENTS

| | | | |
|---|---|---|---|
| 0205289 | 12/1986 | (EP) . | |
| 0216384 | 4/1987 | (EP) . | |
| 0284187 | 9/1988 | (EP) . | |
| 0543647 | 5/1993 | (EP) | F15D/1/12 |
| 1247296 | 10/1989 | (JP) . | |
| 4066392 | 3/1992 | (JP) | B64B/1/58 |

* cited by examiner

Primary Examiner—J. Woodrow Eldred
(74) Attorney, Agent, or Firm—Antonelli, Terry, Stout & Kraus, LLP

(57) ABSTRACT

The invention is a structure for inhibiting the turbulence phenomena of a fluid, exhibiting a surface geometry comprising at least one series of inhibition surfaces which inhibit turbulence present in a boundary layer of the fluid in proximity to the wall of the structure and which extend substantially longitudinally in the direction of flow of the fluid. The inhibition surfaces comprise at least a first series of surfaces ($0_1$) of amplitude $a_1$ and at least a second series of surfaces ($0_2$) of amplitude $a_2$. The second series of surfaces ($0_2$) is arranged so as to be superposed on the first series of surfaces ($0_1$), the first series of surfaces ($0_1$) allowing inhibition of at least turbulence of great amplitude and the second series of surfaces ($0_2$) allowing inhibition of at least turbulences of low amplitude. The structure has an application for forming at least part of a pipe for conveying a pressurized gas.

27 Claims, 1 Drawing Sheet

MODIFIED SURFACE FOR REDUCING THE TURBULENCES OF A FLUID AND TRANSPORTATION PROCESS

BACKGROUND OF THE INVENTION

1. Field of the Invention

The present invention relates to a structure having a surface which reduces turbulence problems existing within the boundary layer of a fluid moving with respect to the surface.

2. Description of the Prior Art

The prior art describes various structures for controlling phenomena due to the interaction of a boundary layer of a fluid in motion with respect to a surface and notably turbulence phenomena.

These structures can be formed by surfaces provided with grooves present in the turbulence region. The axis of the grooves extends in the direction of flow of the fluid. The purpose of these grooves is to reduce the turbulence phenomena existing within the boundary layer of the fluid in motion and, by reducing friction between the surface and the fluid, to minimize pressure drops.

Experiments described in the prior art indicate pressure drop decreases up to 7% for example.

The grooves or pressure drop reduction means can have various geometries, and the number thereof can be selected as a function of the transportation conditions and/or of the nature of the fluid so as to obtain a minimum of pressure drops.

The grooves exhibit for example a slot type rectangular profile or a V-shaped profile.

The prior art also mentions the advantageous use of grooves of cylindrical shape, which can allow the obtaining of fluid anchoring effects, thus preventing development of the turbulence phenomenon in the boundary layer of the flowing fluid.

The expression "boundary layer" refers to a zone wherein a fluid is flowing in a pipe for example close to the wall or to the inner surface of this pipe, wherein the velocity gradient is the highest.

Another structure configuration considered in the prior art associates longitudinal grooves (in the direction of flow of the fluid) with a device arranged and suspended with respect to these grooves, the purpose of the latter being to "break" the swirls of great amplitude whereas the longitudinal grooves will act on the swirls of low amplitude. Such an association is however complex and bulky.

It has also been considered to use more complex geometries than a simple succession of identical grooves.

For example U.S. Pat. No. 5,386,955 describes a specific layout of similar slots or grooves. The slots of various sizes are arranged, according to a selected layout and sequence, in order to inhibit swirls of different scales within the boundary layer of the fluid.

However, such a device with an alternation of fins of different heights does not benefit locally by an addition of the effects (turbulence attenuation) resulting therefrom.

SUMMARY OF THE INVENTION

The present invention relates to a structure which inhibits the turbulence phenomena of a fluid in motion with respect to the structure. The structure exhibits a surface geometry comprising at least one series of turbulence inhibition means in a boundary layer of the fluid close to the structure, the inhibition means extending substantially longitudinally in the direction of flow of the fluid. The structure comprises at least a first series of means $0_1$ of amplitude $a_1$, and at least a second series of means $0_2$ of amplitude $a_2$, the second series of means $0_2$ being arranged so as to be superposed on the first series of means $0_1$, the first series of means $0_1$ inhibiting turbulences of great amplitude and the second series of means $0_2$ inhibiting at least turbulences of low amplitude.

The invention notably, but not exclusively, has applications in the area of transportation of pressurized gas through a pipe. During transportation, friction occurs between the flowing pressurized gas and the wall of the inner pipe, which causes considerable pressure drop. Pressure drop must be compensated to allow optimum transportation of the fluid in the pipe.

In fact, transportation of pressurized gas represents an important economic challenge and intercontinental gas transportation pipelines involve considerable investments.

In this case, the gas transported is natural gas comprising at least 90% methane.

The invention can also be used for transportation of fluids in the form of a turbulent flow. It is also intended for transportation of industrial gases such as synthesis gases, hydrogen, ethylene, etc.

The present invention has the advantage of benefitting simultaneously and at any point from an effect of inhibition of the turbulence on at least two different scales, notably by superposing geometric profiles corresponding to different scales. In the present invention, a large-scale geometric profile forming the base line of a geometric profile of smaller scale is used.

The geometric profile defining the first series of means preferably forms the base line of the geometric profile defining the second series of means.

Advantageously, the amplitude $a_1$ of the first series of inhibition means $0_1$ is preferably greater than the amplitude $a_2$ of the second series of means $0_2$, amplitude $a_1$ being taken with respect to the base surface of the first series of means and amplitude $a_2$ with respect to the base surface of the second series of means.

According to a preferred embodiment of the invention, the structure according to the invention is suited to form at least part of the inner wall of a pipe. The first series of inhibition means $0_1$ exhibits for example a profile of substantially polygonal shape having n sides and r vertices. A segment of a line di delimited by two consecutive vertices forms, with respect to the previous and/or to the next segment of a line (di−1, di+1), an angle α. The value of this angle α is preferably always positive or at least the majority of the angles defining the segments of a line have positive values.

Preferably, the sum of all the inscribed angles for the whole or the majority of the length of the polygonal shape is substantially equal to Π (n−2) wherein n is the number of sides of the polygon.

Advantageously, the number of vertices is greater than 25.

The present invention is advantageously applied for forming the inner wall of a pipe for example with a circular geometry used for the transportation of a pressurized natural gas, under the conditions The inner wall exhibits the specific characteristics of the present invention extends over at least part of the length and the circumference of the pipe intended for transportation. It can be arranged in form of sections within the pipe, the sections being separated by predetermined intervals for example.

It can also extend over almost all or all of the length of the feeder or pipe for conveying the gas.

The pipe can comprise an inner lining exhibiting the characteristics of the aforementioned structure, whose grooves forming the first and the second inhibition means are made for example mechanically and/or chemically so as to obtain the necessary geometric characteristics for inhibiting turbulences.

The pipe intended for transportation of gas comprising at least one structure having the aforementioned characteristics is preferably made of a composite material.

The present invention also relates to a process for transporting a gas, for example a gas on turbulent flow, from a production well to a processing site for example. The process comprises at least the following stages
the gas is expanded at the well outlet to a pressure value at least equal to 5 MPa,
the gas is fed into a pipe having a section so selected that the velocity of flow of the transported gas is for example above 10 m/s, the pipe comprising, for example on at least part of its length, a structure exhibiting the aforementioned characteristics so as to inhibit turbulences in the boundary layer close to the structure.

As a result of the superposition of the turbulence reduction means on various scales, an addition of the turbulence reduction effects is observed.

Thus, by superposing two geometric profiles which, when used individually, lead each to a pressure drop decrease between 5 and 8%, a pressure drop decrease from 10 to 15% can be obtained by means of the superposed arrangement.

BRIEF DESCRIPTION OF THE DRAWINGS

Other features and advantages of the present invention will be clear from reading the description hereafter given by way of embodiment examples, within the scope of non limitative applications for the transportation of a natural gas in a pipe, with reference to the accompanying drawings wherein FIG. 1 diagrammatically shows the velocity profile of the gas flowing in a pipe, FIG. 2 describes an example of the geometry of simple slots or grooves according to the prior art.

DESCRIPTION OF THE INVENTION

In order to allow better comprehension of the main characteristics of the structure according to the invention, the description given hereafter by way of non limitative example relates to the making of a pipe used to transport a pressurized natural gas from a production well to a processing site for example.

Figure 1:
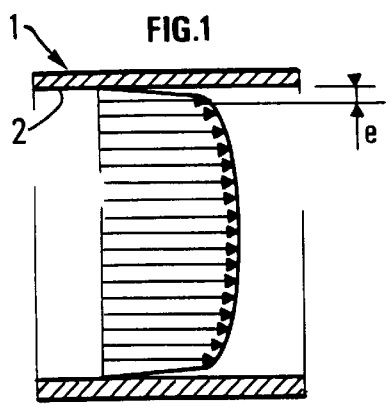

FIG. 1 shows the general shape of the velocity profile of a fluid flowing in a pipe 1, the fluid flow being a flow referred to as "turbulent".

Shearing for turbulent type flows is very high in a layer of relatively reduced thickness "e" and close to the inner wall 2 of pipe 1, the velocity field at the center of the flowing fluid being substantially uniform, unlike the velocity field observed in the boundary layer of thickness "e".

In order to limit the pressure drops resulting from the interaction between the fluid and the inner wall 2 of the pipe, the invention reduces the viscous dissipation effects linked with the turbulence in close vicinity of the wall, by using a structure exhibiting the specific characteristics described hereafter.

Figure 2:
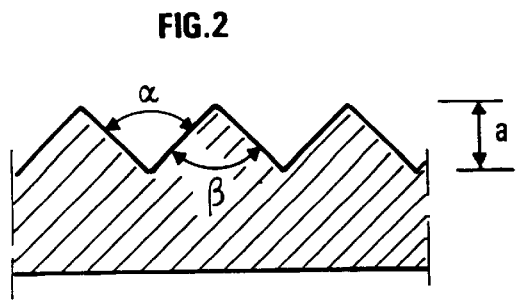

FIG. 2 diagrammatically shows, by means of a cross-section perpendicular to the general direction thereof, an example of the geometry of slots or grooves of simple shape described in the prior art.

The grooved structures or linings described in this figure form a system of longitudinal waves that extend in the direction of flow of the fluid and reduce the viscous dissipation effects linked with the presence of small-scale swirling motions.

A wave 3 shown in FIG. 2 is characterized by a succession of concave parts and of convex parts, defined by a broken line. The segments of a line joining the vertices of this broken line form, at each vertex, an angle ($\alpha$, $\beta$ such that the algebraic sum of the angles $\alpha$ formed by the two successive segments of a line defining a concave part, considered positive, and of the angles D formed by the two segments of a line defining a convex part, considered negative, is zero or substantially equal to 0. Each segment of a line thus forms with the previous segment an alternately positive and negative angle.

The amplitude "a" of waves 3 is in this case, for example, of the order of a few tenths of a millimeter.

Such a wave geometry attenuates or inhibits a turbulence having a substantially constant amplitude scale within the boundary layer of the fluid. The small-scale turbulence present in the close vicinity of the inner wall can thus be damped. However, in most cases, the flows are characterized by a turbulence having several scales, and this system of waves proves to be inadequate.

The present invention is a structure which acts on turbulences exhibiting different amplitude levels. It has been discovered that, in order to damp the effects of turbulence with various scales for example in an industrial pipe intended to transport natural gas, better results are obtained by superposing at least two geometries that damp the effects of the turbulence having at least two amplitude levels (at least two different scales).

Figure 3:
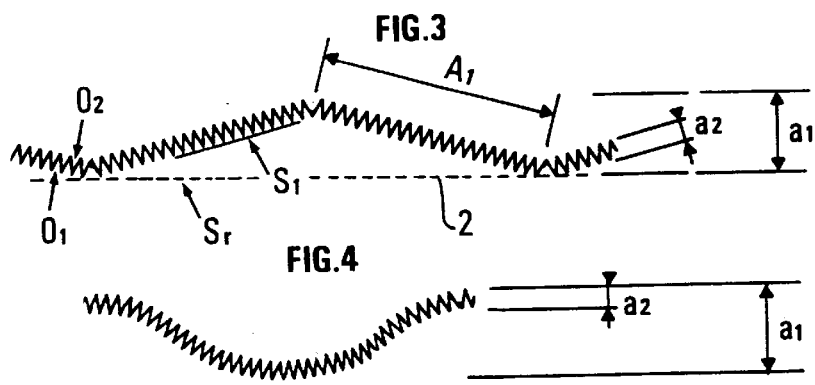
FIGS. 3 to 5 show examples of structures according to the invention comprising a superposition of several means which to inhibit swirling motions of different amplitudes.
Figure 4:
Figure 5:

FIGS. 3 to 5 diagrammatically show, by means of a cross-section, various structure forms of the wall of a pipe. The surface of the wall can thus comprise at least two series of means, superposed on each other, whose purpose is to inhibit at least the swirls or turbulences of different scales that occur in a thickness of a gas in motion with respect to the wall and in the vicinity of the surface or inner wall of the structure.

In the examples described in FIGS. 3 to 5, a system of waves is defined as a whole made up of a series of turbulence inhibiting means that can occur in the form of waves. Two systems of waves $0_1$, $0_2$ will for example be superposed so as to attenuate turbulences having two different amplitudes, the geometric characteristics of these systems being defined for example in relation to reference surfaces as follows:

the first system of waves $0_1$ has an amplitude $a_1$ determined in relation to a reference surface Sr which can be that of the wall of the pipe, the system of waves thus determines a surface S1 defined for example by an imaginary line at the bottom of the waves, the second system of waves $0_2$ has an amplitude $a_2$ which can be defined in relation to surface S1.

In this embodiment example, the first system of waves forms the basis of the second system of waves.

The main purpose of the first system of waves $0_1$ of amplitude $a_1$ is to inhibit at least the swirling motions of great amplitude whereas the purpose of the second system of waves $0_2$ of amplitude $a_2$ is to inhibit at least the swirling motions of low amplitude in the neighborhood of the wall, the expressions swirling motion and turbulence relating to identical phenomena.

The relation $a_1 > a_2$ is preferable.

As a result of the superposition of the two systems of waves $0_1$ and $0_2$ at any point, the inhibition effects obtained by each of these systems of waves, if they were taken individually, add up at least partly.

The ratio between the amplitudes of the two systems of waves $a_1/a_2$ is for example of the order of 10. The value of amplitude $a_1$ is for example of the order of one millimeter while the value of $a_2$ is selected substantially equal to 1/10th of a millimeter.

The profile of the first system of waves $0_1$ described in FIG. 3 exhibits for example the shape of a broken line comprising a succession of substantially rectilinear parts $A_1$ for inhibiting turbulences of great amplitude. The second system of waves $0_2$ whose purpose is to inhibit turbulences of low amplitude is superposed on these rectilinear parts $A_1$.

FIG. 4 describes a structure comprising a first system of waves $0_1$ of sinusoidal shape forming at least partly the wall of a pipe, the sinusoid being substantially perpendicular to the direction of flow of the fluid. The second system of waves $0_2$ inhibiting turbulences of low amplitude is superposed on this system of waves inhibiting swirling motions of great amplitude.

Amplitudes $a_1$ and $a_2$ can take values that are substantially identical to those described in connection with FIG. 3.

In the example given in FIG. 5, the structure according to the invention comprises a first system of waves $0_1$ formed by a succession of projecting elements whose angle at the vertex is relatively reduced.

Such a structure has the advantage of reducing the decrease of the sectional area of flow in relation to the examples given in FIGS. 3 and 4.

Advantageously, in the embodiment of FIGS. 3 to 5, the profile of greater amplitude corresponding to the first system of waves is inscribed between two surfaces $S_1$, Sr whose distance substantially corresponds to amplitude $a_1$.

In case of a pressurized natural gas flowing in a pipe, it is not important that the decrease of the sectional area of flow is relatively low in relation to the total section of the pipe. The profile of greater amplitude is so selected that the section decrease is preferably limited to 1% of this total section.

With the structure shown in FIG. 3, the value of amplitude $a_1$ is preferably less than 0.005 times the value of the inside diameter D of the pipe.

Thus, for a 36-inch inside diameter pipe, the value of the greatest wave amplitude $a_1$ is below 4.6 mm.

The structure geometry shown in FIG. 5 has the advantage of providing a profile of greater amplitude with a lower section decrease. In fact, the specific geometric shape of the first system of waves as shown in this figure generates a lower decrease in the sectional area of flow.

In FIGS. 3, 4 and 5, the second system of waves $0_2$ is a broken line comprising several successive segments of a line. Of course, other geometric shapes can be considered for the second system of waves without departing from the scope of the invention.

It can thus have a sinusoidal profile or consist of a succession of projecting elements arranged periodically, whose geometry is similar to the geometry of the first system of waves shown in FIG. 5.

Figure 6:
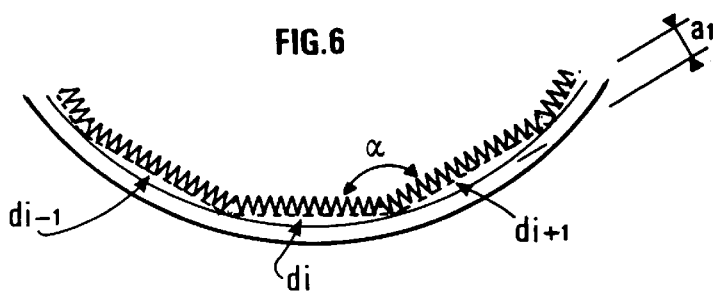
FIG. 6 is a cross-sectional view of an example of use of a structure according to the invention within a pipe, FIGS. 7 and 8 diagrammatically show another embodiment of the invention.

FIG. 6 describes, by means of a cross-section of a circular pipe, a structure which is particularly well-suited to inhibit the effects of a turbulence having several different amplitudes.

The structure illustrated in FIG. 6 has two systems of waves which dampen at least two different turbulence scales. The structure has a first system of waves with a polygonal type profile inscribed between two surfaces whose distance from each other corresponds to an amplitude $a_1$ for example. A second system of waves $0_2$ of amplitude $a_2$ having for example a geometry similar to that of the systems of waves described in FIGS. 3 to 5 is superposed on the first system of waves. Amplitude $a_2$ is less than amplitude a1.

The polygonal profile is made up of several sides or segments of a line di. Segments di are connected to each other, two segments of a line, for example (di−1, di) or (di, di+1), forming together an angle having preferably a positive value, thus defining a vertex. The sum of the angles (x expressed in radians is substantially equal to Π (n−2) wherein n is the number of sides of the polygon. On the other hand, the system of waves described in FIG. 2 has alternately positive and negative angles.

A structure having such a polygonal profile dampen the turbulence whose amplitude is substantially equal to al, which corresponds to the distance between the surface inscribed in the polygon and the surface passing through the vertices r, the second system $0_2$ inhibits the turbulences whose amplitude is substantially close to $a_2$.

Furthermore, the structure described in FIG. 6 has the advantage of keeping a relatively low decrease of the sectional area of flow, preferably less than 1% of the total circular section of the pipe.

To that effect, the number n of sides of the polygonal profile is preferably selected great enough and meets the following conditions $$\frac{\pi^2}{3r} < 0.01;\text{ and}$$

ie. n>25 and $$a_1 \cong \frac{D\pi^2}{2n^2}$$

$a_1 = 0.07D$.

Such a structure advantageously inhibits a range of turbulences that can have several forms, notably turbulences with several amplitudes. The value of $a_1$ can be selected greater than that of the system shown in FIG. 3 while keeping a structure of simple shape so as to inhibit turbulences of greater amplitude.

The embodiment of the structure described in FIG. 6 shows a second system of waves $0_2$ of amplitude $a_2$ whose shape is substantially similar to that of the system of waves of FIG. 2.

Without departing from the scope of the invention, it is possible to superpose on the first polygonal type system of waves a second system of waves of a different geometry, consisting for example of a periodic succession of projecting elements whose geometry is for example similar to the geometry of the wave profile $0_1$ shown in FIG. 5.

Figure 7:

FIG. 7 describes a structure exhibiting such a characteristic.

Since turbulence phenomena are linked to the viscosity of the fluid, whatever the amplitude and the shape thereof, it is possible to consider superpositions and combinations of systems of waves that will have a synergistic effect for optimizing turbulence inhibition.

Figure 8:

FIG. 8 describes an embodiment of a structure comprising a first polygonal type system of waves on which a second system of waves exhibiting a combination of two wave geometries is superposed. The waves of the second system can have different amplitudes. In any case, the greatest amplitude of the second system of waves is less than the amplitude of the first system of waves.

The structure according to the invention described in the FIGS. 3 to 7 is for example used to form part of a pipe intended to transport a pressurized natural gas from a production well to a processing site for example.

The natural gas is expanded at the well outlet to a pressure value of at least 5 MPa, then it is fed into a pipe comprising for example an inner wall at least in the part connected to the outlet of the production well. The section of the production pipe is preferably selected so as to obtain a gas velocity or an average velocity of flow, i.e. the ratio of the volume flow rate of gas to the section of flow, above 10 m/s.

The inhibition effect obtained by superposing the different systems of waves is thus optimized.

A particularly significant application of a structure comprising the characteristics of the invention concerns, as mentioned previously, the transportation of a pressurized natural gas comprising at least 90% of methane.

The pressure value of the gas is preferably above 50 bars and the average velocity of flow preferably meets the value mentioned above.

Such flow conditions and the presence of this type of structure are used to transport pressurized industrial gases, for example to convey a synthesis gas consisting of a mixture of carbon monoxide and of hydrogen or to transport hydrogen, ethylene.

The pipe that comprises the structural characteristics according to the invention can be a metal pipe for example made of steel.

The systems of waves are for example made by grooving mechanically the inner surface of the pipe.

Another procedure consists in producing these grooves by chemical treatment.

It is also possible to conceive an inner lining exhibiting the aforementioned characteristics and to place it in a pipe. Such an embodiment notably allows limiting surface roughness and thus contributes to the reduction of pressure drops.

The inner lining can be obtained by placing a film on the inner surface of a pipe, for example a film made of a polymeric material one face of which comprises a system of longitudinal waves, i.e. a system of waves having a principal axis substantially parallel to the direction of flow.

These waves can be made for example by mechanical grooving, by chemical etching or by molding.

The inner lining can also be made by depositing a coating and by generating mechanically the grooves, or by chemical etching in the coating. The coating can for example be based on epoxy, urethane or epoxy-urethane paint.

The inner lining can also have the form of several superposed layers or multilayers, for example in the form of two or three layers. One or more polymeric films and a coating-based lining can also be superposed.

To superpose several systems of waves, it is also possible to superpose on a layer comprising a surface structure forming a system of waves of relatively great amplitude a film comprising a surface structure forming a system of waves of lower amplitude.

Figure 9:
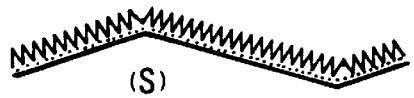
FIG. 9 shows another embodiment wherein several films are superposed to obtain the structure according to the invention.

An embodiment example of such a structure is shown in FIG. 9. A film (f) comprising a surface structure forming a system of waves of amplitude $a_2$ is deposited on a support surface (S) comprising a surface structure forming a system of waves of amplitude $a_1$.

It is also possible to superpose several films $(f_1)$, $(f_2)$, ... comprising each a surface structure forming a system of waves of descending amplitude.

To obtain a system of waves with at least two different scales, it is possible to combine different operating methods. For example, the surface structure forming a system of waves of relatively great amplitude can be made by mechanical grooving and the structure of lower amplitude by chemical etching for example.

The pipe can also be a flexible pipe made of a composite material, whose inner surface exhibits a system of waves in accordance with the present invention.

The waves have a longitudinal general direction parallel to the axis of flow of the gas and they are preferably continuous. However, they can slightly diverge from this direction and not be strictly rectilinear, they can also be discontinuous and interrupted over part of their length without departing from the scope of the invention.

Of course, without departing from the scope of the invention, the layers can be made of materials of different natures, and mechanical and chemical techniques can be used to form the grooves in the same part of a pipe.

What is claimed is:

1. A surface geometry which is at least part of an inner surface in a pipe which inhibits turbulence in the pipe in which fluid moves within the pipe, the surface geometry comprising:

a first series of turbulence inhibiting surfaces in a boundary layer of the fluid in a vicinity of the pipe, the first series of turbulence inhibiting surfaces extending longitudinally in a direction of flow of the fluid and having an amplitude a, and a second series of turbulence inhibiting surfaces having an amplitude $a_2$ which are superimposed on the first series of turbulence inhibiting surfaces with the first series of turbulence inhibiting surfaces inhibiting turbulence of a first amplitude and the second series of turbulence inhibiting surfaces inhibiting turbulence of a second amplitude less than the first amplitude, the amplitude a, being greater than the amplitude $a_2$ with the amplitude a, being measured with respect to a base surface of the first series of turbulence inhibiting surfaces and the amplitude $a_2$ being measured with respect to a base surface of the second series of turbulence inhibiting surfaces and the base surface of the first series of turbulence inhibiting surfaces having a polygonal profile comprising n straight sides wherein n is $\geq 3$ and a plurality of vertices subtending an angle formed between adjacent straight sides of the polygon.

2. A surface geometry in accordance with claim 1 wherein:

the angle $\alpha$ is less than 180°.

3. A surface geometry in accordance with claim 2 wherein:

n is greater than 25.

4. A surface geometry in accordance with claim 1 wherein:

a sum of all of the angles $\alpha$ is substantially equal to $(n-2)\pi$.

5. A surface geometry in accordance with claim 2 wherein:
a sum of all of the angles α is substantially equal to (n−2)π.

6. A surface geometry in accordance with claim 3 wherein:
a sum of all of the angles α is substantially equal to (n−2)π.

7. A surface geometry in accordance with claim 1 wherein:
n is selected to meet the following conditions:

$$\frac{\pi^2}{3r} < 0.01, n > 25,$$

and $$a_1 \cong \frac{D\pi^2}{2n^2} \text{ wherein}$$

r is a number of vertices and D is an inside diameter of the pipe.

8. A surface geometry in accordance with claim 2 wherein:
n is selected to meet the following conditions:

$$\frac{\pi^2}{3r} < 0.01, n > 25,$$

and $$a_1 \cong \frac{D\pi^2}{2n^2} \text{ wherein}$$

r is a number of vertices of the polygonal profile and D is an inside diameter of the pipe.

9. A surface geometry in accordance with claim 3 wherein:
n is selected to meet the following conditions:

$$\frac{\pi^2}{3r} < 0.01, n > 25,$$

and $$a_1 \cong \frac{D\pi^2}{2n^2} \text{ wherein}$$

r is a number of vertices of the polygonal profile and D is an inside diameter of the pipe.

10. A surface geometry in accordance with claim 4 wherein:
n is selected to meet the following conditions:

$$\frac{\pi^2}{3r} < 0.01, n > 25,$$

and $$a_1 \cong \frac{D\pi^2}{2n^2} \text{ wherein}$$

r is a number of vertices of the polygonal profile and D is an inside diameter of the pipe.

11. A surface geometry in accordance with claim 5 wherein:
n is selected to meet the following conditions:

$$\frac{\pi^2}{3r} < 0.01, n > 25,$$

and $$a_1 \cong \frac{D\pi^2}{2n^2} \text{ wherein}$$

r is a number of vertices of the polygonal profile and D is an inside diameter of the pipe.

12. A surface geometry in accordance with claim 6 wherein:
n is selected to meet the following conditions:

$$\frac{\pi^2}{3r} < 0.01, n > 25,$$

and $$a_1 \cong \frac{D\pi^2}{2n^2} \text{ wherein}$$

r is a number of vertices of the polygonal profile and D is an inside diameter of the pipe.

13. A surface geometry in accordance with claim 1 wherein:
the surface geometry extends along at least part of a length of the pipe.

14. A surface geometry in accordance with claim 1 wherein:
the surface geometry extends over at least part of a circumference of the pipe.

15. A surface geometry in accordance with claim 1 wherein:
the first and second series of turbulence inhibiting surfaces are mechanically formed grooves.

16. A surface geometry in accordance with claim 1 wherein:
the first and second series of turbulence inhibiting surfaces are chemically formed grooves.

17. A surface geometry in accordance with claim 1 wherein:
the surface geometry comprises a composite material.

18. A process for transporting gas comprising:
providing a pipe including a surface geometry as defined in claim 1; and
transporting gas through the pipe.

19. A process for transporting gas comprising:
providing a pipe including a surface geometry as defined in claim 2; and
transporting gas through the pipe.

20. A process for transporting gas comprising:
providing a pipe including a surface geometry as defined in claim 3; and
transporting gas through the pipe.

21. A process for transporting gas comprising:
providing a pipe including a surface geometry as defined in claim 4; and
transporting gas through the pipe.

22. A process for transporting gas comprising:
providing a pipe including a surface geometry as defined in claim 7; and
transporting gas through the pipe.

23. A process for transporting gas comprising:

providing a pipe including a surface geometry as defined in claim 13; and transporting gas through the pipe.

24. A process for transporting gas comprising:

providing a pipe including a surface geometry as defined in claim 14; and transporting gas through the pipe.

25. A process for transporting gas comprising:

providing a pipe including a surface geometry as defined in claim 15; and transporting gas through the pipe.

26. A process for transporting gas comprising:

providing a pipe including a surface geometry as defined in claim 16; and transporting gas through the pipe.

27. A process for transporting gas comprising:

providing a pipe including a surface geometry as defined in claim 17; and transporting gas through the pipe.

* * * * *